Feb. 23, 1943.  E. W. THIELE  2,312,006
CATALYTIC CONVERSION
Filed Oct. 21, 1938

INVENTOR
Ernest W. Thiele
BY Donald E. Payne
ATTORNEY

Patented Feb. 23, 1943

2,312,006

UNITED STATES PATENT OFFICE 2,312,006

CATALYTIC CONVERSION

Ernest W. Thiele, Chicago, Ill., assignor to Standard Oil Company, Chicago, Ill., a corporation of Indiana Application October 21, 1938, Serial No. 236,152

10 Claims. (Cl. 196—52)

This invention relates to catalytic conversion and it pertains more particularly to the catalytic cracking or dehydrogenation of petroleum oils for the production of high quality motor fuel.

An object of my invention is to provide a method for supplying the heat required for catalytic cracking or dehydrogenation and for controlling and utilizing the heat generated by catalyst regeneration. Heretofore, catalytic conversion processes of this type have required expensive and complicated apparatus for maintaining closely controlled conversion temperatures and for preventing overheating during the regeneration step; an object of my invention is to provide a method for avoiding such complicated and expensive apparatus—i. e., to effect a simplification of catalyst chamber design and catalyst handling and control apparatus.

In catalytic conversion processes it is extremely important to avoid channeling and "dead spaces" in the catalyst mass. It has been found that protuberances in catalyst chambers seriously affect the flow of gases therethrough and cause channeling to such an extent that very inferior yields and incomplete conversion result. An object of my invention is to provide a method for employing simple cylindrical catalyst chambers in which such channeling may be wholly avoided.

In certain continuous catalyst processes serious problems arise in controlling the flow of catalyst through tubes in order to prevent channeling and dead spaces, to prevent the sticking of the catalyst in the tubes, and to prevent the disintegration of catalyst as it passes through valves or flow control devices. An object of my invention is to solve these problems.

A further object of the invention is to obtain larger yields per pass of cracked gasoline, smaller gas yields and higher antiknock qualities in the finished gasoline than have heretofore been obtainable in the case of catalytic cracking. A further object is to obtain increased efficiency and higher conversion rates in dehydrogenation processes. Catalysts are most effective at the time they initially go on stream or shortly thereafter. The catalyst effectiveness then gradually diminishes until it reaches the point at which regeneration becomes necessary. An object of my invention is to regenerate the catalyst at short intervals so that it will operate with maximum effectiveness and at the same time to incorporate with the catalyst a heat storing medium which supplies the heat required for catalytic conversion and which absorbs, during the regeneration step, the heat generated by the burning of carbonaceous materials from the catalyst during the regeneration step. My object is to relate the size, amount and nature of heat retention material with the times on stream in an endothermic catalytic reaction so that the heat conductivity of the material and its specific heat will make it effective throughout the length of the run. Other objects of the invention will be apparent as the detailed description proceeds.

In practicing the invention I employ with any conventional catalyst a flowable heat retention medium which has practically no catalytic effect in the reaction but which absorbs and releases heat in the successive steps of regeneration and reaction, which prevents channeling, and which materially expedites the handling of catalyst material in continuous systems.

This heat retention material is preferably iron shot about $\frac{1}{16}$ to $\frac{1}{8}$ inch in diameter, or about the same size as the catalyst particles. Smooth quartz pebbles of about the same size may be used instead of or in combination with the iron shot. Instead of iron shot I may use comminuted particles of iron or any other metal which does not melt or deleteriously effect the catalyst or reaction at temperatures of 850 to 1050° F. Instead of quartz pebbles I may use crushed rock particles which have the desired high specific heat and conductivity, which do not spall and which do not affect the catalyst or reaction at temperatures of 850 to 1050° F. I prefer, however, to use iron shot or quartz pebbles of about $\frac{1}{16}$ inch diameter although the diameter may range from materials passing a 40 mesh and retained on a 50 mesh screen to materials passing a $\frac{1}{4}$ inch and retained on a 10 mesh screen.

The amount of heat retention material employed with the catalyst will depend on the particular catalytic reaction and the nature and amount of catalyst material which is used. In catalytic cracking for instance, the iron shot will have about 8 times the density of activated hydrosilicate of alumina. In this case I prefer to use equal volumes of heat retention material and catalyst. Thus if the heat of cracking is 360 B. t. u. per pound and the cracking per pass is 33%, then the heat consumed would be 120 B. t. u. and the fall in temperature of the gas in continuous operation would be about 150° F., provided the catalyst activity, and therefore the cracking per pass, did not fall off during operation. If a period of 10 minutes cracking, followed by regeneration, is employed, and 140 grams of oil vapor are passed through the chamber per liter of catalyst during this period, the fall in temperature may be approximately 80° F., provided the initial temperature of the catalyst bed is the same as the entering temperature of the oil vapors. Larger periods between regenerations and smaller feed rates per liter of catalyst will produce greater falls in temperature, and vice-versa.

If, however, I employ an equal volume of iron shot per volume of catalyst, i. e. about 8 pounds of iron per pound of catalyst, this iron will absorb and retain enough heat during the catalyst regeneration step to supply the heat of cracking so that the temperature drop through the catalyst will be only about 20° F. under the above-mentioned conditions.

I have found that in catalytic cracking of one pound of gas oil to the extent of 33% there is usually at least about 0.0085 pound of carbon deposited on the catalyst. When this amount of carbon is burned from the catalyst in the regeneration step it liberates 120 B. t. u. and thus raises the temperature of the heat retention medium back to the upper limit. If larger amounts of carbon are deposited in the catalyst, the excess heat in the regeneration step may be carried off in vented flue gas as will be hereinafter described.

An important aspect of the invention is the correlation of particle size, specific heat and conductivity of the heat retention material with the time of the heating and heat liberating periods. Sufficient time must be allowed to permit the heat from the inner portions of the heat retention material to be conducted to the surface thereof and given up to the catalyst and gases. Large particle sizes would result in relatively small surface areas for heat absorption and relatively long time requirements for giving up and absorbing the necessary heat. The particle sizes which I employ are for short time cracking and regeneration periods, preferably about 10 or 15 minutes each, although they may be as long as several hours or longer.

Particle size of heat retention material is important not only for the short cycle operations but for obtaining maximum flowability. Another aspect is the better packing and flowability of the catalyst which is brought about by the inclusion of about an equal volume of iron shot or quartz pebbles. Catalyst material is necessarily porous and its outer surface is sometimes rough and jagged which tends to make it bridge—i. e. pack unevenly. When such a catalyst flows through a tube or regulating means there is a tendency for it to stick. I have discovered that by mixing an equal part of quartz pebbles or iron shot with this catalyst a fluent mass is obtained which packs evenly throughout the entire catalyst volume which thereby avoids channeling and which can be easily handled in continuous catalyst chambers as will hereinafter be described.

The invention will be more clearly understood from the following description read in connection with the accompanying drawing which forms part of this specification and in which.

Figure 1:
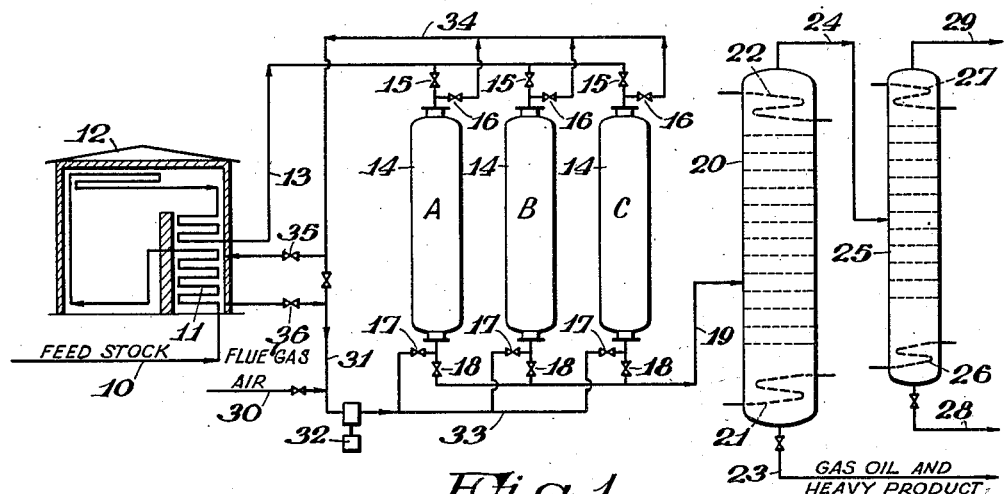
Figure 1 is a flow diagram of the system used in my process.

While the invention is applicable to endothermic catalytic processes generally, it will be described in detail in connection with the catalytic cracking of Mid-Continent gas oil over Super Filtrol, an activated hydrosilicate of alumina in which the ratio of silica to alumina is 3.3 by weight or 5.63 by mols. The catalyst per se forms no part of the present invention and will not be described in further detail. It should be understood that the invention is equally applicable to silica gel catalysts on which alumina is deposited and onto which various promoters, such as copper, cadmium, manganese, nickel, etc. may be adsorbed.

The feed stock which may be a 35° Bé. Mid-Continent gas oil is charged through line 10 to coils 11 of pipe still 12 wherein the oil is vaporized and heated to a transfer line temperature at about 850 to 1000° F., preferably 925° F. Transfed line 13 is manifolded to discharge the heated gas into certain of the catalyst chambers 14 while other of these catalyst chambers are being regenerated. The pressure is preferably from atmospheric to about 100 pounds per square inch and the space velocity of gases through the catalyst chamber is about 0.25 to 2 volumes of liquid feed per volume of catalyst space per hour.

It should be understood that valves 15 are open and valves 16 are closed in those chambers in which cracking is taking place. Similarly, valves 17 are closed and valves 18 are open so that the reaction products may be discharged through line 19 into fractionating tower 20. This tower may be provided with a suitable reboiler 21 at its base and reflux means 22 at its top, the conditions being so regulated as to remove products heavier than gasoline through line 23 and to remove gasoline and gases through line 24 to stabilizer 25.

The stabilizer likewise is provided with heating means 26 at its base and reflux means 27 at its top, gasoline being withdrawn through line 28 to storage and gases being withdrawn through line 29 for further use or refinement. These gases, preferably after removing hydrogen, methane and perhaps ethane and ethylene therefrom, may be sent through a polymerization system or may be recycled to line 10 for further conversion (called gas reversion) with the feed stock. The gas oil and heavy products from line 23 may be charged to a thermal cracking or gas reversion process or they may be recycled with the feed stock in line 10. The particular utilization of these products forms no part of the present invention and will not be described in further detail.

The catalyst chambers may remain on stream for periods ranging from 5 or 10 minutes to 8 or 10 hours or longer, depending upon the particular catalyst employed. I have found that the maximum conversion rates occur during the first 10 minutes or immediately after the catalyst goes on stream and the catalyst efficiency gradually decreases with the extended time on stream. Furthermore, it takes about ten minutes for the heat which is stored in the heat retention material to be liberated and effectively used for cracking. I therefore prefer to limit the catalytic cracking to about 10 minutes in each chamber followed by a catalyst regeneration step of 10 minutes duration.

Catalyst regeneration is effected by closing valves 15 and 18 and opening valves 16 and 17 so that air from line 30 together with flue gas from line 31 may be forced by pump 32 through manifold 33 and the respective valves 17 to the catalyst chamber. Hot regeneration gases leave the catalyst chamber through valves 16 and manifold 34. These hot gases may be introduced through line 35 into the convection section of pipe still 12 or they may be directly recirculated to pump 32. A cooler may be inserted in line 31 prior to pump 32 if temperature regulation at this point is necessary. Since the flue gas in convection section of furnace 12 is at substantially constant temperature I may withdraw the flue gas for recirculation from this convection section through line 36. Regeneration gases may, of course, be introduced at the top instead of the bottom of the chamber.

In the regeneration step sufficient air is introduced to gradually burn the carbon which has become deposited on the catalyst but not enough to cause any hot spots in the catalyst bed. The presence of the heat retention material greatly facilitates temperature control during the regeneration step because the iron shot or quartz pebbles effect uniform distribution of the oxygen containing gases throughout the catalyst mass and also this material absorbs localized heat and tends to maintain an even temperature throughout that portion of the catalyst which is undergoing the regeneration. It seems that in such regeneration processes combustion is not uniform throughout the catalyst chamber. A "hot spot" beginning at the point of oxygen introduction gradually moves from one end of the chamber to the other. Care must be taken to prevent this localized hot spot from reaching a temperature higher than 1000° F. or 1050° F. but such temperature control is easily accomplished in the presence of my heat retention material. If this hot spot temperature does reach 1000° F. it is cooled to about 950° F. by subsequent flow of regeneration gases during the remainder of the regeneration step so that at the end of the catalyst regeneration, the temperature of the catalyst mass is about 950 to 960° F. Valves 16 and 17 will then be closed and valves 15 and 18 will then be opened for another catalytic cracking period.

While I have described cracking and regeneration steps at specific temperatures, it should be understood that cracking temperatures in the case of the silica-alumina catalyst may range from 850° to 1000° F., the regeneration being effected below 1050° F. For other catalysts and other reactions the temperatures may be quite different, but the principle of my invention remains the same.

Figure 2:
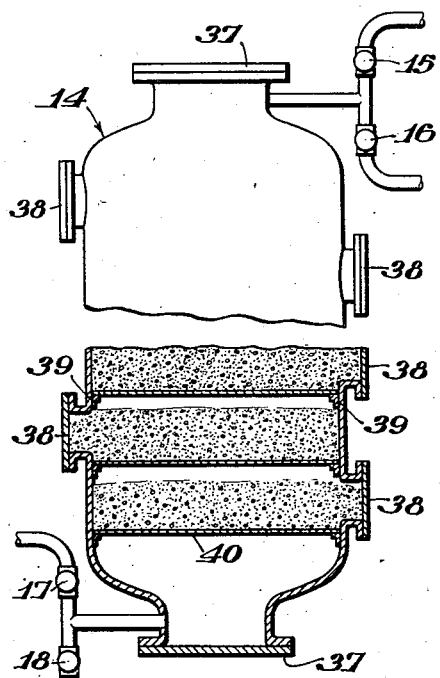
Figure 2 is a vertical plan partly in section showing a preferred type of fixed catalyst chambers.

My invention is particularly useful in fixed catalyst chambers of the type illustrated in Figure 2. A vertical cylindrical tube or drum 14 may be provided with suitable manholes 37 at the top and bottom and manholes 38 at the side. Flanged annular rings or brackets 39 may support perforated plates or catalyst retention screens 40. The separate beds of catalysts are slightly spaced from each other so that there is a redistribution of gases from bed to bed as these gases pass upwardly or downwardly through the chamber.

Figure 5:
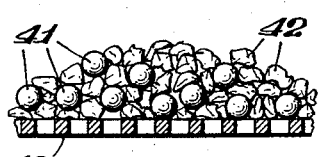
Figure 5 is an enlarged vertical section showing the relation of heat retention medium to catalyst on a catalyst support.

Referring to Figure 5 it will be seen that the rounded particles of inert heat retention material 41 are closely and intimately dispersed with the granular or pelleted catalyst particles 42 so that a heat transfer medium is immediately adjacent each catalyst particle. The presence of these rounded particles throughout the catalyst mass tends to prevent bridging of the catalyst particles and thus to prevent channeling of the gases undergoing conversion. The weight and smooth surface of the rounded particles tend to keep the catalyst evenly distributed and packed.

Figures 3, 4:
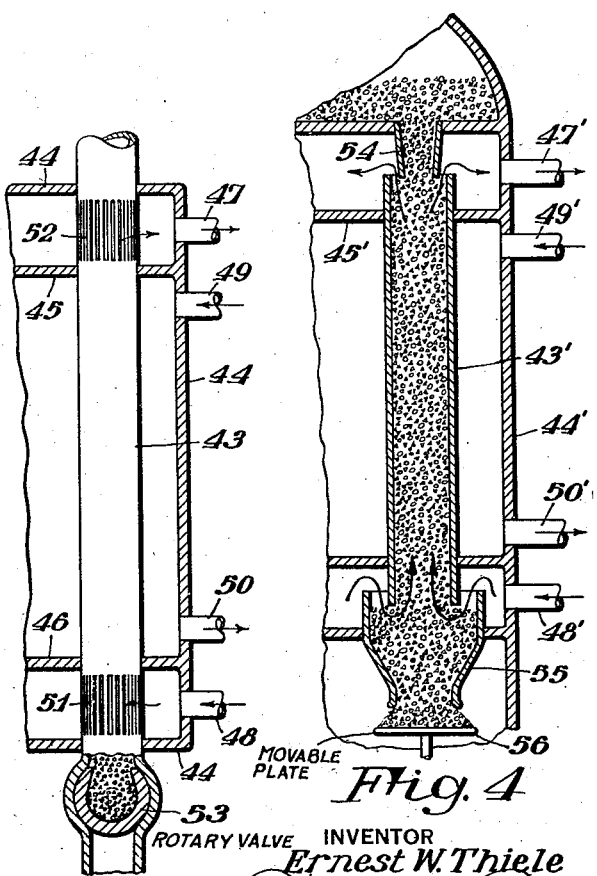
Figure 3 is a vertical plan partly in section showing a continuous catalyst chamber.
Figure 4 is a vertical plan of a modification of a continuous catalyst chamber.

My invention is also applicable to continuous systems employing moving catalyst beds as illustrated in Figures 3 and 4. In Figure 3, for instance, a large number of tubes 43 may be mounted in any suitable shell or casing (diagrammatically indicated by a side wall 44). Partition 45 spaced from the top and a partition 46 spaced from the bottom respectively may form gaseous feed and discharge chambers for the whole nest of tubes, the gases either being introduced through line 47 and discharged through line 48 or introduced through line 48 and discharged through line 47. If desired hot flue gases or other heating fluids may be introduced through line 49 and discharged through line 50 or vice versa. If gases are introduced through line 48 into the space between wall 46 in the bottom of the chamber these gases enter the catalyst tubes through slots 51 and leave the catalyst tubes through slots 52 and finally leave the chamber through line 47.

Heretofore a large number of tubes 43, each of small diameter, have been required in order to obtain temperature control and heat for the reaction. Use of my heat retention material makes possible the use of large diameter tubes and in fact makes possible the total elimination of the heat transfer medium, lines 49 and 50, etc.

Catalyst may be introduced through tube 43 from a hopper (not shown) above shell 44 which is preferably closed to the atmosphere to prevent the escape of gases. Flow of the catalyst through the tube is controlled by valve 53 which is preferably of the modified rotary plug valve type. The plug has a deeply recessed cup on one side instead of having a hole all the way through as the valve. When it is intermittently or continuously rotated, the cup alternately fills and empties, thus transferring catalyst at a definite rate from above to below the valve. The particular feature of this valve is its minimizing of the crushing action which rules out most valves designed for this purpose. Tests on various catalysts have shown that even with considerable depth of catalyst in the tubes only a very small amount of the catalyst is crushed by passage through the valve. The function of this valve is not only to insure accurately controlled catalyst discharge but also to prevent the escape of any gases from catalyst tube 43.

The rounded particles of iron shot or quartz facilitate the flow of catalyst through tube 43 tending to keep the catalyst evenly packed at all times, to prevent any bridging or sticking of the catalyst and to insure an even flow with minimum crushing.

In the modification shown on Figure 4 there is a gas-tight hopper above chamber 44' and also a gas-tight catalyst receiver below this chamber. The catalyst is introduced into tube 43' through nipples 54, the gases entering or leaving tube 43 through the annular space between the tube and the nipple. Instead of a rotary valve at the bottom of the tube there is a funnel shaped member 55 with a movable plate 56 spaced from the small end thereof. By reciprocating or shaking this plate the flow of catalyst through the tube may be accurately controlled. Gases enter or leave the bottom of tube 43' in the annular space between vertical walls of funnel member 55 and the lower end of tube 43'.

In the continuous catalyst tube represented by Figures 3 and 4 the catalyst regeneration is effected in a separate zone from the catalytic cracking but here again the inert heat retention material serves to regulate and stabilize both the temperature of catalytic cracking and the temperature of regeneration. In continuous processes the catalyst may, for instance, be regenerated in apparatus of the same type illustrated in Figures 3 and 4, thus avoiding the cumbersome and expensive rotary kiln or a wedge-type clay burner that has heretofore been suggested. Hot catalyst at a temperature of about 950° F. may then be reintroduced into the hopper and passed through the tubes 43 or 43' for further catalytic conversion.

My invention is also applicable to the dehydrogenation of naphthas or hydrocarbon gases or heavier hydrocarbon oils. For dehydrogenation my catalyst is preferably magnesium chromite, or molybdenum oxide on alumina, or chromium oxide deposited on alumina. Here again, however, it should be understood that any conventional catalyst may be used, the catalyst per se forming no part of the present invention. The general arrangement of apparatus and the sequence of process steps may be the same in catalytic dehydrogenation as for catalytic cracking except that temperatures and pressures will, of course, be dependent upon the nature of the particular stock undergoing dehydrogenation and the nature of the catalyst employed.

In my preferred example I have described the use of an equal volume of iron shot and catalyst respectively but it should be understood that the quantity of heat retention material may be varied throughout a relatively wide range without departing from the invention. Ordinarily I prefer to employ about ¼ to 4 volumes of heat retention material per volume of catalyst but it will be evident that the amount of such material will be dependent upon its specific heat, its density, its heat conductivity and upon the nature of the reaction involved, the type of equipment employed, and on the time between regenerations.

The heat retention material hereinabove described should not be confused with catalyst carriers heretofore employed. Catalyst carriers depend upon their rough or absorbent surfaces and their porosity—their ability to adsorb or carry the catalyst material and to effect intimate contact with said material with gases undergoing treatment. My heat retention material, on the other hand, is preferably a dense, hard, smooth inert material of high specific heat—and high heat conductivity—a material which is inert with respect to the catalyst and the reaction but which exerts its beneficial effect in controlling the temperature of the reaction and the regeneration, in promoting flowability of the catalyst and in preventing channeling, dead spots, bridging, etc. in the catalyst mass.

While I have described preferred embodiments of my invention it should be understood that I do not limit myself to said details except as defined by the following claims, which should be construed as broadly as the prior art will permit.

I claim:

1. The method of controlling temperatures in catalytic conversion processes which comprises admixing with a catalyst about 25% to 400% by volume of a dense non-combustible heat retention material of high specific heat and heat conductivity having a particle size about the same as that of the particle size of the catalyst material and being inert toward the catalyst and the catalytic reaction.

2. The method of supplying the heat for catalytic conversion of hydrocarbon oils which comprises admixing a catalyst with about 25% to 400% by volume of an inert, dense non-combustible heat retention material of high specific heat and heat conductivity having a particle size passing a ¼ inch screen and retained on a 50 mesh screen, contacting said catalyst and heat retention material under reaction conditions with said hydrocarbon oil whereby carbon is deposited on the catalyst, burning said carbon from said catalyst in intimate contact with said heat retention material whereby said material stores a large quantity of heat, and contacting said catalyst in intimate admixture with said hot material with further amounts of hydrocarbons to undergo conversion whereby the heat of conversion may be supplied by heat liberated by said heat retention material.

3. The method of converting gas oil to high quality motor fuel which comprises heating said gas oil to a temperature of about 850° to 1000° F., contacting said oil at this temperature and at a pressure of from atmospheric to 100 pounds per square inch with activated hydrosilicate of alumina admixed with about 25% to 400% by volume of a non-combustible heat retention material, fractionating the products of the catalytic conversion, periodically regenerating the catalyst by burning carbon deposits therefrom with an oxygen containing gas whereby heat is stored in said heat retention material, repeating said catalytic conversion step whereby the heat stored in said heat retention material is utilized to supply the heat of cracking.

4. The method of claim 3 wherein the catalytic conversion step and the regeneration step are each of about 10 minutes duration.

5. The method of supplying heat for a catalytic conversion process wherein the catalyst periodically becomes coated with carbon, which method comprises admixing with said catalyst about an equal volume of dense non-combustible particles of high specific heat and heat conductivity, storing heat in said particles by burning carbon from said catalyst, and utilizing the heat stored in said particles for converting further amounts of hydrocarbon oil by means of said catalyst.

6. In an endothermic hydrocarbon conversion process which is effected at temperatures of about 850 to 1000° F. in the presence of a catalyst on which carbonaceous material is deposited during the conversion process and from which it is burned off in a regeneration step, the method of supplying heat of conversion which comprises admixing about 25% to 400% by volume of a catalytically inert non-combustible heat-retention material with the catalyst, heating said heat-retention material to a temperature at least about 100° F. above the desired conversion temperature by burning carbonaceous material from the catalyst in a regeneration step, and passing hydrocarbon vapors over said catalyst in the presence of said heat-retention material after the regeneration step and while the heat-retention material is still at least about 25° F. above the desired conversion temperature so that at least a part of the endothermic heat of conversion is supplied by the heat liberated from said heat-retention material.

7. The method of claim 6 wherein the hydrocarbon vapors are passed over the catalyst in the presence of the heated heat-retention material in a fixed bed catalyst zone.

8. The method of supplying the endothermic heat of conversion for catalytic hydrocarbon conversion processes wherein hydrocarbon vapors are contacted with catalysts at temperatures of about 850° to 1000° F. in the presence of catalysts and wherein carbonaceous material is alternately deposited on the catalyst in the conversion step and removed therefrom in a regeneration step, which method comprises intimately associating said catalyst with about 25% to 400% by volume of an inert non-combustible heat-retention material, heating said inert heat-retention material to a temperature higher than average conversion temperature by burning said carbonaceous material from the catalyst in a regeneration step, and passing hydrocarbon vapors thru said catalyst while it is associated with said heat-retention material and before said heat-retention material has cooled from regeneration temperature to the average conversion temperature whereby at least a part of the exothermic heat of regeneration is utilized to supply the endothermic heat of catalytic conversion.

9. The method of controlling temperatures in a cycle of an endothermic catalytic conversion process and regeneration of the catalyst wherein there is deposited upon particles of the catalyst a predetermined amount of a combustible residue later burned off by regeneration gases, which method comprises admixing with the catalyst a relatively inert dense heat retention material of high specific heat and high heat conductivity having a particle size about the same as the particle size of the catalyst material, the proportion of heat retention material being such that the absorption of heat by the admixture between the conversion temperature and the desired maximum regeneration temperature is sufficient to have a substantial effect in preventing the temperature of the admixture from rising above said maximum temperature during the regeneration, the heat actually absorbed by the admixture during regeneration being at least enough to furnish the endothermic heat required in the conversion.

10. The method of effecting an endothermic reaction such as catalytic cracking which comprises contacting a charging stock at conversion temperature with a catalyst admixed with about an equal volume of iron, the particle size of the iron being about the same as the particle size of the catalyst, depositing sufficient carbon on the catalyst in the contacting step to supply on combustion at least the heat required for the endothermic reaction, discontinuing said contacting step after about a ten minute on-stream period, regenerating the catalyst by burning carbon therefrom with a gas comprising air whereby the temperature of the catalyst-iron mixture is increased to an extent sufficient to store in the mixture the heat required for the next endothermic conversion step, removing any excess regeneration heat from the catalyst-iron mixture, and utilizing the heat stored in said mixture for converting further amounts of hydrocarbon oils by means of said catalyst.

ERNEST W. THIELE.